(12) United States Patent
Rinta-Aho et al.

(10) Patent No.: US 9,591,601 B2
(45) Date of Patent: Mar. 7, 2017

(54) METHOD, CONTROL NODE, GATEWAY AND COMPUTER PROGRAM FOR ENABLING COMMUNICATION WITH A NEWLY DETECTED DEVICE

(71) Applicant: TELEFONAKTIEBOLAGET L M ERICSSON (PUBL), Stockholm (SE)

(72) Inventors: Teemu Rinta-Aho, Espoo (FI); Heikki Mahkonen, San Jose, CA (US); Tero Kauppinen, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/654,408

(22) PCT Filed: Dec. 20, 2012

(86) PCT No.: PCT/SE2012/051458
§ 371 (c)(1),
(2) Date: Jun. 19, 2015

(87) PCT Pub. No.: WO2014/098676
PCT Pub. Date: Jun. 26, 2014

(65) Prior Publication Data
US 2015/0334672 A1 Nov. 19, 2015

(51) Int. Cl.
*H04W 60/00* (2009.01)
*H04L 12/28* (2006.01)
(Continued)

(52) U.S. Cl.
CPC ......... *H04W 60/00* (2013.01); *H04L 12/2818* (2013.01); *H04W 4/005* (2013.01);
(Continued)

(58) Field of Classification Search
CPC ..... H04W 4/005; H04W 8/005; H04W 84/14; H04W 8/265; H04W 72/048;
(Continued)

(56) References Cited

U.S. PATENT DOCUMENTS 7,760,109 B2 *  7/2010  Broad ................. G08B 25/009
                                                    340/286.02
8,154,401 B1    4/2012  Bertagna
(Continued)

FOREIGN PATENT DOCUMENTS

WO         03063043 A1    7/2003
WO      2011053216 A1    5/2011
(Continued)

*Primary Examiner* — Brandon Miller (57) ABSTRACT

A method, control node, gateway and computer programs in a communications network for enabling communication with a newly detected device connected to the network. The method comprises receiving a request message including an id associated with the newly detected device from a gateway, and retrieving configuration data associated with the device based on the id, from a device vendor database, where the device vendor database is indicated by the id. The method further comprises providing a resource in the communications network based on the configuration data, acknowledging the request message to the gateway, thereby enabling the device to communicate with the resource in the communications network.

11 Claims, 9 Drawing Sheets

(51) Int. Cl.

| | | |
|---|---|---|
| *H04W 72/04* | (2009.01) | |
| *H04W 48/14* | (2009.01) | |
| *H04W 28/16* | (2009.01) | |
| *H04W 4/00* | (2009.01) | |
| *H04W 8/00* | (2009.01) | |
| *H04W 8/24* | (2009.01) | |
| *H04W 8/26* | (2009.01) | |
| *H04W 84/18* | (2009.01) | |

(52) U.S. Cl.
CPC ............ *H04W 8/005* (2013.01); *H04W 28/16* (2013.01); *H04W 48/14* (2013.01); *H04W 72/048* (2013.01); *H04W 8/24* (2013.01); *H04W 8/265* (2013.01); *H04W 84/18* (2013.01)

(58) Field of Classification Search
CPC ....... H04W 28/16; H04W 48/14; H04W 8/24; H04W 84/18; H04L 12/2818
See application file for complete search history.

(56) References Cited

U.S. PATENT DOCUMENTS

| | | |
|---|---|---|
| 2006/0011728 A1 | 1/2006 | Frantz |
| 2008/0137673 A1* | 6/2008 | Phuah .................... H04L 12/66 370/401 |
| 2009/0061869 A1* | 3/2009 | Bui ................... H04L 29/12283 455/435.1 |
| 2010/0057485 A1 | 3/2010 | Luft |
| 2010/0125894 A1* | 5/2010 | Yasrebi ............... H04L 12/2818 726/4 |
| 2012/0044865 A1 | 2/2012 | Singh et al. |
| 2012/0094680 A1 | 4/2012 | Stackelius et al. |
| 2012/0106462 A1 | 5/2012 | Cao |
| 2012/0166261 A1 | 6/2012 | Velusamy |

FOREIGN PATENT DOCUMENTS

| | | |
|---|---|---|
| WO | 2011107895 A1 | 9/2011 |
| WO | 2012007029 A1 | 1/2012 |

* cited by examiner

METHOD, CONTROL NODE, GATEWAY AND COMPUTER PROGRAM FOR ENABLING COMMUNICATION WITH A NEWLY DETECTED DEVICE

This application is a 371 of International Application PCT/SE2012/051458, filed Dec. 20, 2012, the disclosure of which is fully incorporated herein by reference.

TECHNICAL FIELD

The present disclosure relates generally to methods, a control node, a gateway and computer programs in a communications network for enabling communication with a newly detected device connected to the network.

BACKGROUND

An increasing number of devices are being connected to communication networks. Devices may be involved in machine-to-machine communication, or involved in machine-to-human communication, for example providing data for various services. Examples of devices are sensors, actuators, or other kind of peripheral electronics.

A device operating as a sensor may be connected to a communications network, where the device is delivering its sensor data via the network, in such a way that another machine or a user is capable to interpret the data. Sometimes an intermediate device is translating or converting the data, such that it becomes to a more suitable format for e.g. a human user. A communications network may be a small closed network, a group of closed networks capable to intercommunicate, an operator network or the Internet.

Devices of today are typically sold and delivered to normal consumers, with no or limited knowledge in communication networks. When a device is connected to a communications network today, a common procedure is to manually set-up, configure and operate the device or the network in order to enable communication and to enable exchange of device data over the communications network. A problem with the procedure of manual configuration and operation may be that it is both troublesome and invites risks for faults for a non-expert in communications networks. The manual procedure may introduce faults in the configuration of device and/or communication network. In the extension, the manual procedure may reduce the use of devices. A common expected growth of the number of device vendors may further increase the complexity for a non-network expert.

Another problem is how to automatically adopt or configure a communications network, such that a user configuration/input/intervention may be limited to a minimum, or completely avoided. Another problem is how to provide good data integrity and privacy, such that no unauthorized personnel may read or manipulate information or devices.

SUMMARY

It is an object of the invention to address at least some of the problems and issues outlined above. It is possible to achieve these objects and others by using a method and an apparatus as defined in the attached independent claims.

According to an aspect, a method is provided performed by a control node in a communications network for enabling communication with a newly detected device connected to the network. The method comprises receiving a request message including an id associated with the newly detected device from a gateway. The method also comprises retrieving configuration data associated with the device based on the id, from a device vendor database, where the device vendor database is indicated by the id. The method also comprises providing a resource in the communications network based on the configuration data. The method also comprises acknowledging the request message to the gateway, thereby enabling the device to communicate with the resource in the communications network.

An advantage with a method performed by a control node is that when a newly connected device is detected, communication may be automatically enabled with the device, thereby is troublesome manual configuration avoided.

According to another aspect, a control node is provided in a communications network for enabling communication with a newly detected device connected to the network. The node is adapted to receive a request message including an id associated with the newly detected device from a gateway. The node is further adapted to retrieve configuration data associated with the device based on the id, from a device vendor database, where the device vendor database is indicated by the id. The node is further adapted to provide a resource in the communications network based on the configuration data. The node is adapted to acknowledge the request message to the gateway, thereby enabling the device to communicate with the resource in the communications network.

An advantage with a control node in a communications network is that the control node may automatically provide a resource for a newly connected device, such that the device automatically is reachable for another machine or a user.

According to another aspect, a computer program, comprising computer readable code means is provided, which when run in a control node adopted to enable communication with a newly detected device, causes the control node adopted to enable communication with a newly detected device to perform the corresponding method. The computer program product, comprising a computer readable medium and a computer program is stored on the computer readable medium.

According to another aspect, a method is provided performed by a gateway in a communications network for enabling communication with a newly detected device connected to the network. The method comprises detecting the newly connected device. The method further comprises transmitting a request message including an id associated with the newly detected device to a control node. The method further comprises receiving an acknowledgement to the request message from the control node, thereby enabling the device to communicate with a resource in the communications network.

According to another aspect, a gateway is provided in a communications network for enabling communication with a newly detected device connected to the network. The gateway is adapted to detect the newly connected device. The gateway is further adapted to transmit a request message including an id associated with the newly detected device to a control node. The gateway is further adapted to receive an acknowledgement to the request message from the control node, thereby enabling the device to communicate with a resource in the communications network.

The above method, control node, gateway and computer programs may be configured and implemented according to different optional embodiments. In one possible embodiment the configuration data comprises at least one of configuration information and a software component. In another embodiment a registration message is received from the gateway, an acknowledgement message is transmitted to the gateway acknowledging a successful registration, wherein when the gateway is already registered, the acknowledgement includes information about at least one resource already provided for the gateway. In another embodiment the registration message includes information about at least one of authentication, privileges and subscription. In another embodiment the id associated with the device comprises at least one of device vendor, vendor address, device type, cryptographic number, software version and MAC-address. In another embodiment when the control node is unable to resolve the device vendor database indicated by the id, complementing device information is retrieved from a device identification node, for resolution of from which device vendor database to retrieve configuration data.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable communication with a newly detected device, i.e. a device newly detected in a communication network. When a device is connected to a communications network, the device may not be previously known or directly recognized by the network. When the new device is detected by a gateway, the gateway may request a control node to provide a resource for the newly detected device. The control node retrieves data from a vendor database, and uses the data to provide a resource for the device. An identity of the device is used to select from which vendor database to retrieve the data. A device may be manufactured and shipped a long way, through various distributors around the world before reaching a final destination with a user, consumer or at an installation site. The manufacturer of the device is likely to best know the characteristics or requirements of the device. Information about such characteristics or requirements may be stored in a database, such as the vendor database.

A problem today may be to handle devices from arbitrary vendors. An example is how to start using a device in a network which is not prepared for devices from a particular vendor, or when a completely new vendor is about to enter the market. A problem is how to lower the barriers of start using devices connected to a communications network.

When the control node has provided the resource for the device, it is acknowledged to the gateway, and thereby the device is enabled to communicate with the resource in the communications network. The resource may translate data exchange with the device into a generic format, or may provide a user friendly interface to the device.

An advantage with the solution is that a user may not need to manually configure the device or the communications network, for enabling usage of a new device. Another advantage is that a device may be assigned an appropriate resource for optimal operation or usage.

Figure 1:
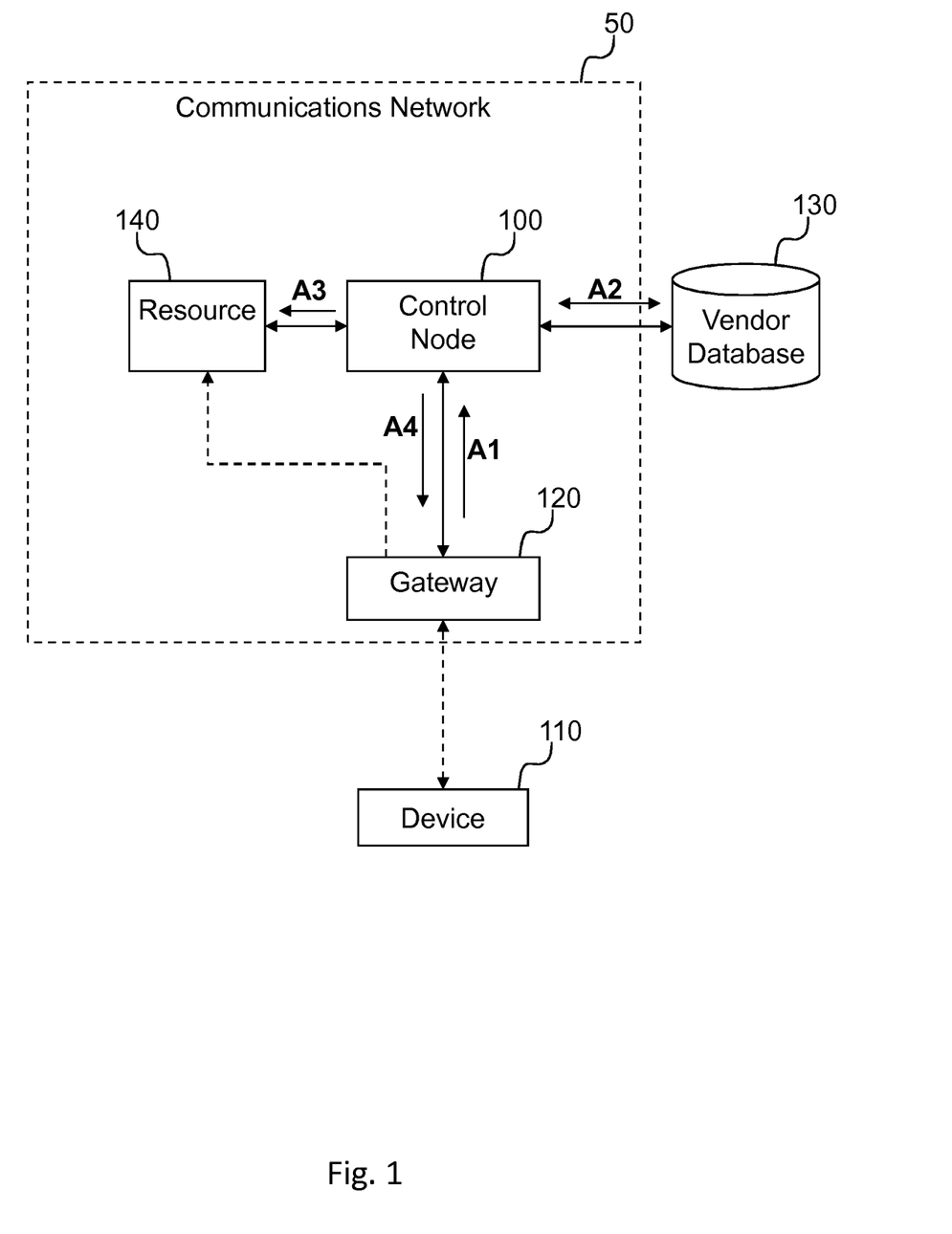
FIG. 1 is a communication scenario illustrating the solution.

Now the solution will be exemplified in more detail. FIG. 1 shows a block diagram with a control node 100 in a communications network 50, a device 110 which connects to a gateway 120, a vendor database 130 with data associated with the device 110 and a resource 140 provided by the control node 100.

Figures with the same references in the different figures, is intended to have similar meaning in the different figures.

Figure 2:
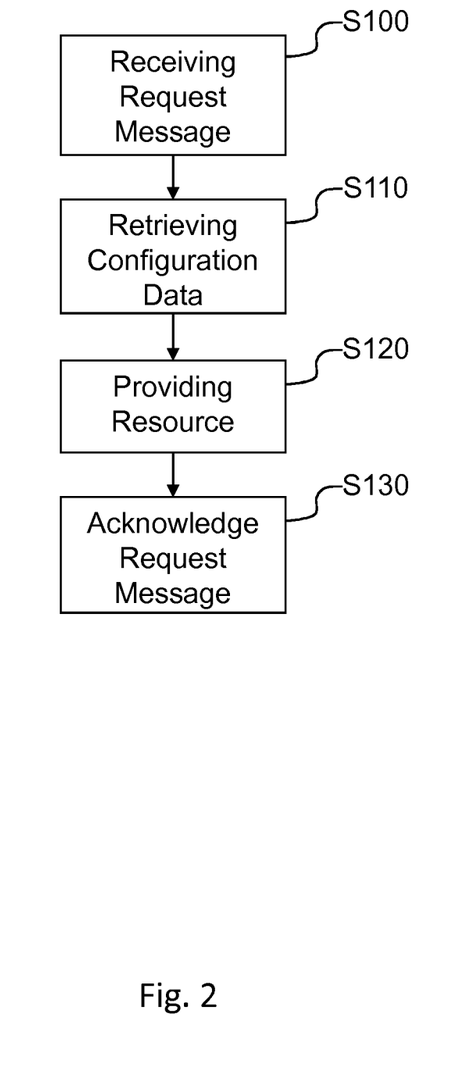
FIG. 2 is a flow chart illustrating a procedure in a control node.

FIG. 2 shows a flowchart of a method performed by the control node 100 in the communications network 50 for enabling communication with a newly detected device 110 connected to the network 50. The method comprises receiving a request message S100 including an id associated with the newly detected device 110 from a gateway 120. The method comprises retrieving configuration data S110 associated with the device 110 based on the id, from a device vendor database 130, where the device vendor database 130 is indicated by the id. The method comprises providing S120 a resource 140 in the communications network 50 based on the configuration data. The method comprises acknowledging S130 the request message to the gateway, thereby enabling the device 110 to communicate with the resource 140 in the communications network 50.

The request message received by the control node 100 may be carried for example by a standard protocol such as DHCP (Dynamic Host Configuration Protocol), SNMP (Simple Network Management Protocol), HTTP/HTTPS (Hypertext Transfer Protocol/Secure), SIP/SIPS (Session Initiation Protocol/Secure), not limiting other standard protocols to be used. The request message may also be carried by a specific protocol adapted for communication with a control node 100. The request message may also be carried by a standard protocol which is adapted for communication with a control node 100. The message includes information indicating that the gateway 120 has detected a newly connected device 110 and the id associated with the device. The term "id" may also be denoted "identification", or "identifier". The message may request enablement of communication for the newly connected device 110.

The control node 100 retrieves configuration data from the vendor database 130, where the vendor database 130 is selected based on the id. The selection of vendor database 130 may be based on a table mapping the id with an address to the associated vendor database 130. The table may also be in the form of a database. The id of the device 110 may as well include the address to the vendor database 130. When the data is retrieved from the vendor database 130, the data is used to provide a resource 140 in the communications network 50. A few non-limiting examples of a resource 140 are: a virtual machine, virtual server, virtual client, a physical computer, an API (Application Programming Interface), a web-server, or similar.

When the resource 140 is provided and operational, the control node 100 acknowledges this back to the gateway 120, by acknowledging the request message. The acknowledgement may include an address to the provisioned resource 140, such as an IP-Address (Internet Protocol), an URI/URL (Uniform resource identifier/Uniform resource locator), or similar address method including ports or protocols to be used. Thereby is the device 110 enabled to communicate with the resource 140. In a case where the control node 100 has retrieved configuration data for a particular device 110, the control node 100 may use the same configuration data for a similar device 110 detected by a second gateway 120, such that the control node 100 may avoid to retrieve the same configuration data again.

The step S110 may include a number of sub-steps, examples of such sub-steps are; transmission of a request including the id of the device 110 from the control node 100 to the vendor database 130, a reply including an address to where to download the configuration data from vendor database 130 to the control node 100, a download of the configuration data from the vendor database 130 to the control node 100.

In an example of the solution, the configuration data comprises at least one of configuration information and software component. The configuration data which is used in the provision of the resource 140 may comprise configuration information, or software components, or other similar tools, instructions of components useful in the step of provisioning of the resource 140. It may as well be a combination of information and components. Configuration information may be used for configuring of a standard web-server, such that the web-server becomes configured for enabling communication with the device 110. A software component may be provisioned such that it operational becomes a virtual machine, enabling communication with the device 110. Another example is where configuration data is a combination of different components. It may be configuration information for a standard server, e.g. a web server, and a software component in the form of an API which is adopting the communication with the server and such that the standard server and the API together form a resource 140. Thereby may the communication between the device 110 and the resource 140 be enabled.

Figure 3:
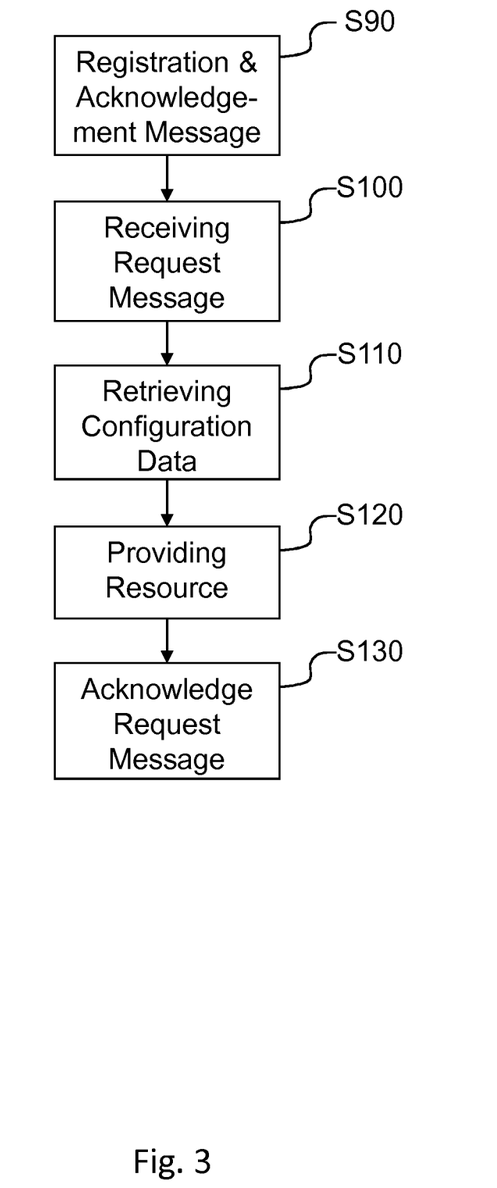
FIG. 3 is a flow chart illustrating a procedure in a control node, according to further possible embodiments.

In an example of the solution, shown in the flowchart in FIG. 3, the method may comprise a registration message received S90 from the gateway 120. Further that an acknowledgement message is transmitted to the gateway 120 acknowledging a successful registration, wherein when the gateway 120 is already registered, the acknowledgement may include information about at least one resource 140 already provided for the gateway 120.

Prior reception of any requests messages from a gateway 120 to the control node 100, the gateway 120 may need to register with the control node 100, or to establish a session or a virtual connection with the control node 100. An example of that is by reception of a registration message from the gateway 120 to the control node 100, and when the request has been accepted an acknowledgement is transmitted from the control node 100 to the gateway 120. If the gateway 120 already is registered at the control node 100, or has previously been registered with the control node 100, the acknowledgement message may include resources 130 already provided for the gateway 120. When the gateway 120 is informed about already provisioned resources 140, the gateway 120 may not need to request the control node 100 about a detected device 110 again. The registration may be, for example, carried out via DHCP, SNMP, PDP (Packet Data Protocol) context creation, or according to TR069 (Technical Report 069), not limiting other suitable network management protocols to be used. At this stage the control node 100 may authenticate and may authorize the gateway 120.

In an example of the solution, the registration message includes information about at least one of authentication, privileges and subscription. Different gateways 110 may have different privileges or different subscription types. The subscription type or set of privileges may be communicated to the gateway 120 from the control node 100 via the registration message, in the acknowledgement.

In an example of the solution, the id associated with the device 110 comprises at least one of device vendor, vendor address, device type, cryptographic number, software version and MAC-address. When a gateway 120 detects a new device 110 in its network, the gateway 120 may try to identify the vendor and the type of a device 110.

In an example of the solution, when the control node 100 is unable to resolve the device vendor database 130 indicated by the id, complementing device information may be retrieved from a device identification node 150, for resolution of from which device vendor database 130 to retrieve configuration data. The device identification node 150 is for example shown in FIG. 4. The device identification node 150 may be found by reading a table or database internal at the control node 100, with device vendor servers to request. The device identification node 150 may also be found through use of DNS (Domain Name system), or by use of DHT (Distributed Hash Table).

Figure 4:
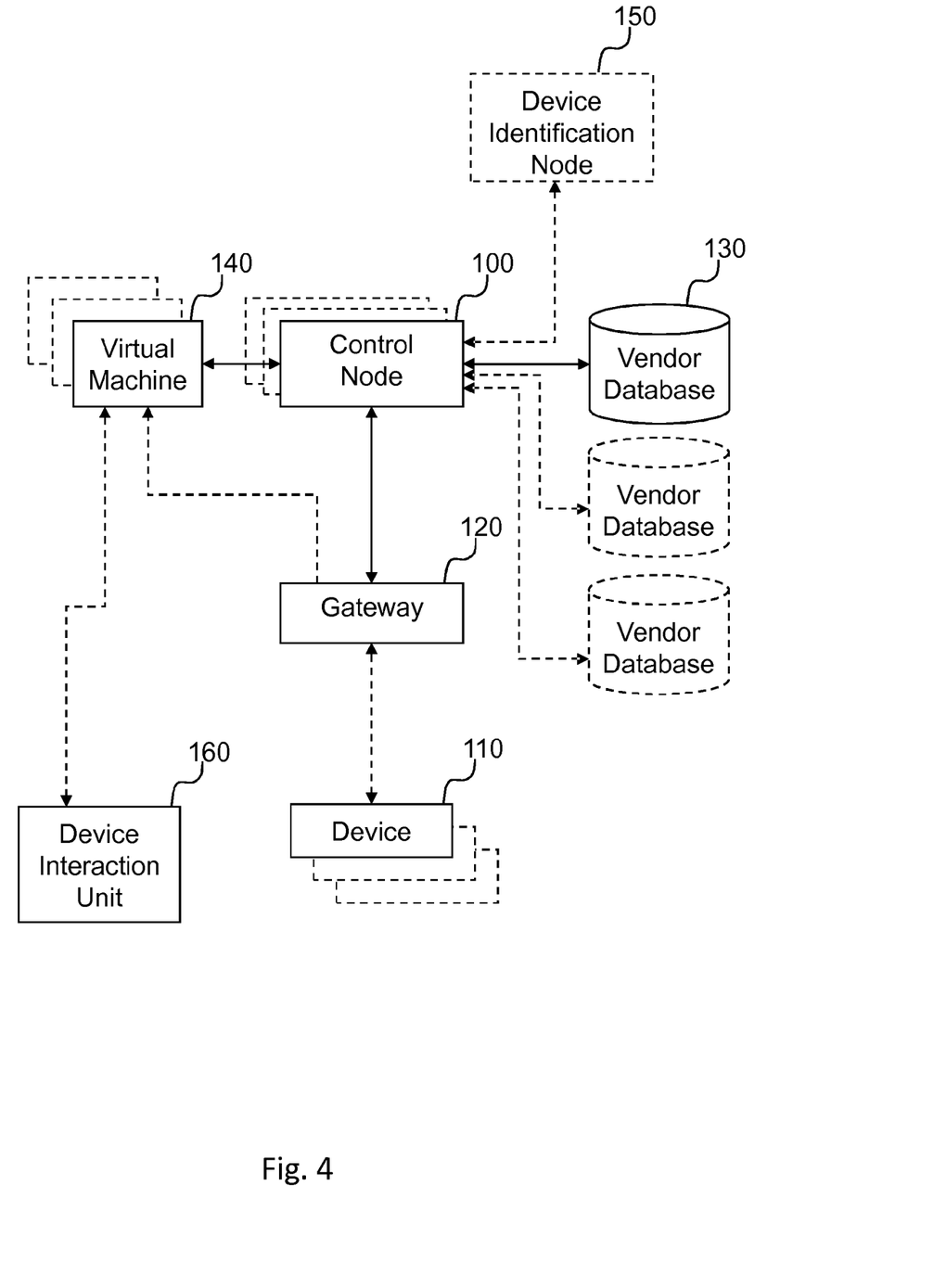
FIG. 4 is a block diagram illustrating further possible embodiments.

FIG. 4 shows a block diagram of the solution, with the control node 100 in the communications network 50 for enabling communication with the newly detected device 110 connected to the network 50. The node is adapted to receive the request message including the id associated with the newly detected device 110 from the gateway 120. The node is further adapted to retrieve configuration data associated with the device 110 based on the id, from the device vendor database 130, where the device vendor database 130 is indicated by the id. The node is further adopted to provide the resource 140 in the communications network 50 based on the configuration data. The node is further adopted to acknowledge the request message to the gateway, thereby enabling the device 110 to communicate with the resource 140 in the communications network 50.

The control node 100 may be a separate server located in an operator network. The control node 100 may be a virtual server located in an operator data environment. The control node 100 may be a server located in a cloud based environment. Examples of a device 110 shown in FIG. 4 are sensors, actuators, or other kind of peripheral electronics. Sensors commonly used may include sensors for temperature, humidity, oxygen level, pH, depth, wind, rain, speed, acceleration, movement and so forth not limiting other types of sensors. The sensors may be used in a large spectrum of appliances: indoor, outdoor, various industrial appliances, vehicle mounted, and life science to mention a few examples not limiting other uses. Examples of actuators are heaters, coolers, breaking systems, engines, etc. Peripheral electronics may be monitors, cameras, speakers, x-ray equipment, and equipment for magnetic resonance imaging or other kind of similar electronics. The device 110 may communicate via different kind of communication protocols related to PAN (Personal Area Network), LAN Local Area Network, WAN Wide Area Network). A few non-limiting examples of protocols used are TCP/UDP/IP (Transfer Control Protocol/User Datagram Protocol/Internet Protocol), Ethernet, Bluetooth, LonTalk (home automation protocol according to ISO/IEC 14908), ZigBee (according to IEEE 802), WLAN (Wireless LAN), GSM/GPRS (Global System for Mobile Communications/General Packet Radio Service), 3G (3rd generation of mobile telecommunications technology), LTE (Long Term Evolution), not limiting to similar communication protocols or network solutions.

Examples of the gateway 120 shown in FIG. 4 are ADSL router (Asymmetric Digital Subscriber Line), wireless LAN access device, fiber-to-the-home termination device, access points for wireless devices, mobile terminal, vehicle arranged terminal, home automation access units, TV set top boxes, pluggable PC's (miniaturized network connected PC), and similar network access points, not limiting to other units. The gateway 120 may also be a function in a network, such as the communications network 50, a 3GPP (3rd Generation Partnership Project), provided as a cloud based service, not limiting to similar provisions. The vendor database 130 may be located with a vendor, with at least one vendor database 130 located with each device vendor participating in the solution. The vendor database 130 may be located such that a group of vendors may cooperate around one vendor database 130. The resource 140 may be a physical server, a virtual server, a virtual machine, an interface or any other suitable resource for communication with a device, such as the device 110. A group of devices 110 may share one common resource 140.

The device identification node 150 may be a database located with a device vendor or located at a common place, serving a group of vendors. When the control node 100 not has been able to resolve from which vendor database 130 to retrieve configuration data, the control node 100 may retrieve further device 110 information from the device identification node 150. Information which enables to resolve a proper id of the device 110. An example of a task performed by the device identification node 150 is translation of a MAC-address in a proper address to the correct vendor database 130.

The device interaction unit 160, shown in FIG. 4, may be used by a user to interact with the device 110. The device interaction unit 160, may be a mobile phone, a PDA (Personal Digital Assistant), a personal computer, or similar, not limiting to other units. The user may via the device interaction unit 160 connect to the resource 140 and via the device interaction unit 160 and the resource 140, the user may interact with the device 110.

In an example of the solution, the configuration data may comprise at least one of configuration information and a software component. The configuration information may be in a plain text format, a table format, a binary format, not limiting other formats suitable for a resource 140. The software component may be a script, a file with software in binary format, a group of files, not limiting the software component to other formats suitable for a resource 140.

In an example of the solution, the control node 100 may be adapted to receive a registration message from the gateway 120. The control node 100 may be further adopted to transmit an acknowledgement message to the gateway 120 which acknowledges a successful registration, wherein when the gateway 120 is already registered, the acknowledgement includes information about at least one resource 140 already provided for the gateway 120.

In an example of the solution, the registration message may include information about at least one of authentication, privileges and subscription. The control node 100 may authenticate and/or authorize the gateway 120, to verify that the gateway 120 is authentic. The control node 100 may check any privileges and/or subscriptions associated with the gateway 120, such that the gateway 120 is provided a correct security level, and/or access to appropriate networks, and/or provided the correct service levels and has the correct rights to request provision of resources 140.

In an example of the solution, the id associated with the device 110 may comprise at least one of device vendor, vendor address, device type, cryptographic number, software version and MAC-address.

In an example of the solution, when the control node 100 may be unable to resolve the device vendor database 130 indicated by the id, the control node 100 may be adopted to retrieve complementing device information from a device identification node 150. With the information from the device identification node 150, it may be possible to resolve from which device vendor database 130 to retrieve configuration data. An example is where a MAC-address (Media Access Control) of a device 110 has been captured in the detection. However, the control node 100 may not be able to resolve the MAC-address into an address of a vendor database 130. The device identification node 150 may, as a non-limiting example has the MAC-address listed with an association to the vendor of the device. Thereby may the device identification node 150 be able to respond an address to a vendor database 130.

Figure 5:
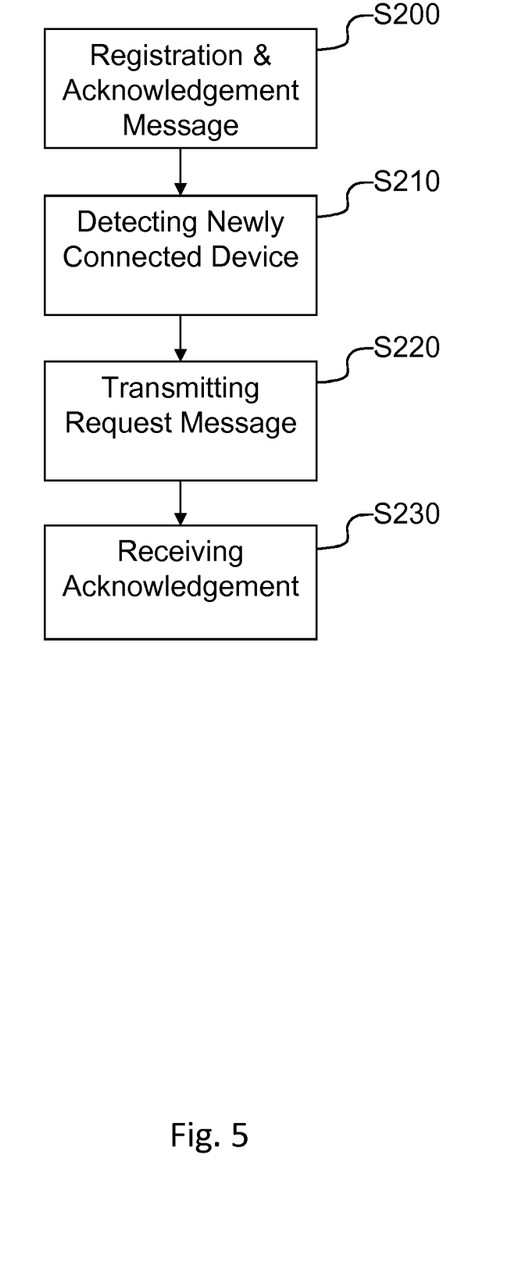
FIG. 5 is a flow chart illustrating a procedure in a gateway.

Now looking at FIG. 5, which shows a flowchart illustrating an example of the solution. A method performed by the gateway 120 in the communications network 50 for enabling communication with a newly detected device 110 connected to the network 50. The method comprises detecting S210 a newly connected device 110. The method comprises transmitting S220 a request message including an id associated with the newly detected device 110 to a control node 100. The method comprises receiving S230 an acknowledgement to the request message from the control node 100, thereby enabling the device 110 to communicate with the resource 140 in the communications network 50.

In an example of the solution, the method may comprise transmission S200 of a registration message to the control node 100. The method may comprise reception of an acknowledgement message from the control node 100 acknowledging a successful registration, wherein when the gateway 120 is already registered, the acknowledgement includes information about at least one resource 140 already provided for the gateway 120.

In an example of the solution, the registration message includes information about at least one of authentication, privileges and subscription.

In an example of the solution, the id associated with the device 110 may comprise at least one of device vendor, vendor address, device type, cryptographic number, software version and MAC-address.

Further is an illustrative example of the solution, shown in FIG. 4, where the gateway 120 in the communications network 50 for enabling communication with a newly detected device 110 is connected to the network 50, adapted to detect a newly connected device 110. The gateway is adapted to transmit a request message including an id associated with the newly detected device 110 to a control node 100. The gateway is adapted to receive an acknowledgement to the request message from the control node 100, thereby enabling the device 110 to communicate with the resource 140 in the communications network 50.

In an example of the solution, the gateway may be adopted to transmit a registration message to the control node 100. The gateway may be adopted to receive an acknowledgement message from the control node 100 which acknowledges a successful registration, wherein when the gateway 120 is already registered, the acknowledgement includes information about at least one resource 140 already provided for the gateway 120.

In an example of the solution, the gateway may be adopted to in the registration message include information about at least one of authentication, privileges and subscription.

In an example of the solution, the id associated with the device 110 may comprise at least one of device vendor, vendor address, device type, cryptographic number, software version and MAC-address.

Figure 6:
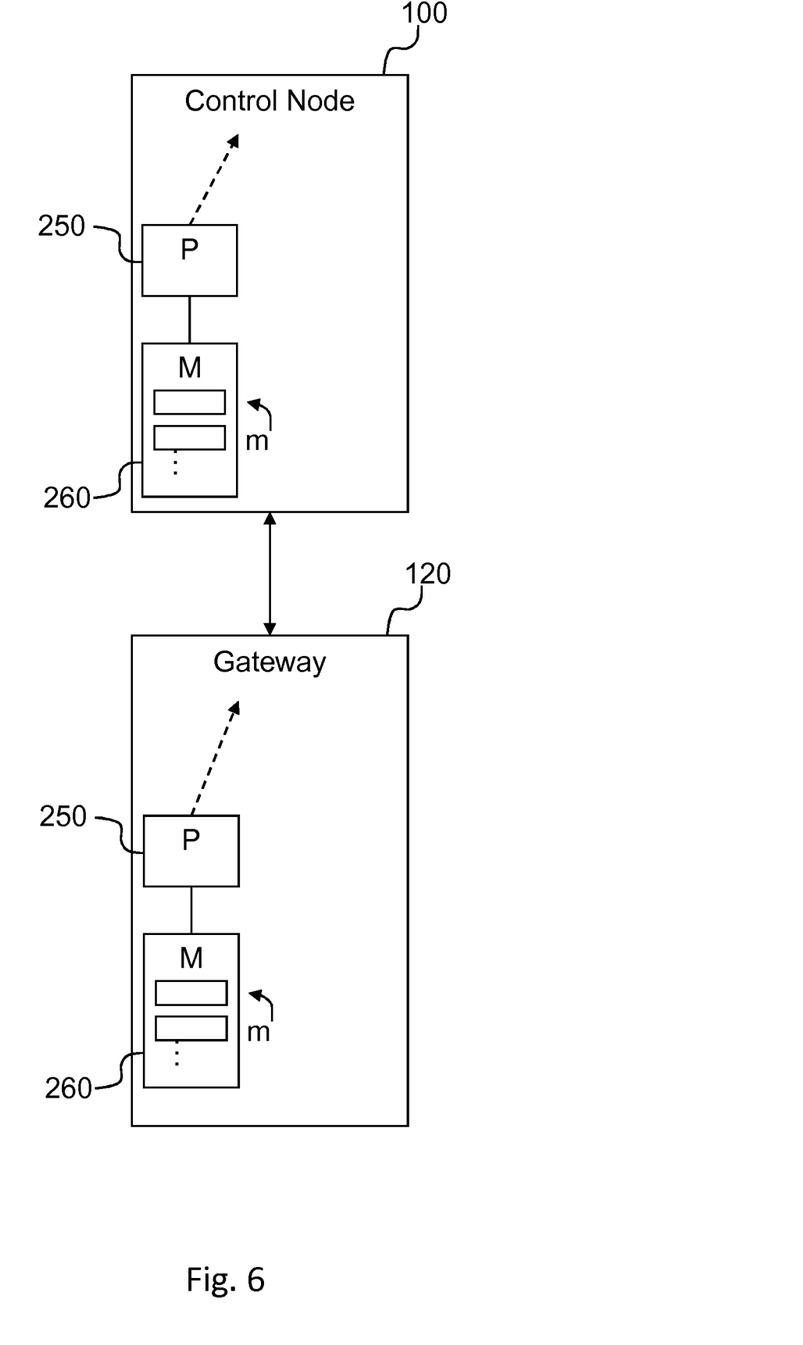
FIG. 6 is a flow chart illustrating a procedure in a gateway, according to further possible embodiments.

Now looking at FIG. 6. The control node 100 and the gateway 120 described above may be implemented, by means of program modules of a respective computer program comprising code means which, when run by processor "P" 250 causes the control node 100 and the gateway 120 to perform the above-described actions. The processor P 250 may comprise a single Central Processing Unit (CPU), or could comprise two or more processing units. For example, the processor P 250 may include general purpose microprocessors, instruction set processors and/or related chips sets and/or special purpose microprocessors such as Application Specific Integrated Circuits (ASICs). The processor P 250 may also comprise a storage for caching purposes.

Each computer program may be carried by computer program products "M" 260 in the control node 100 and the gateway 120, shown in FIG. 1, 4, 6, et al, in the form of memories having a computer readable medium and being connected to the processor P. Each computer program product M 260 or memory thus comprises a computer readable medium on which the computer program is stored e.g. in the form of computer program modules "m". For example, the memories M 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the control node 100 and the gateway 120.

Figure 7:
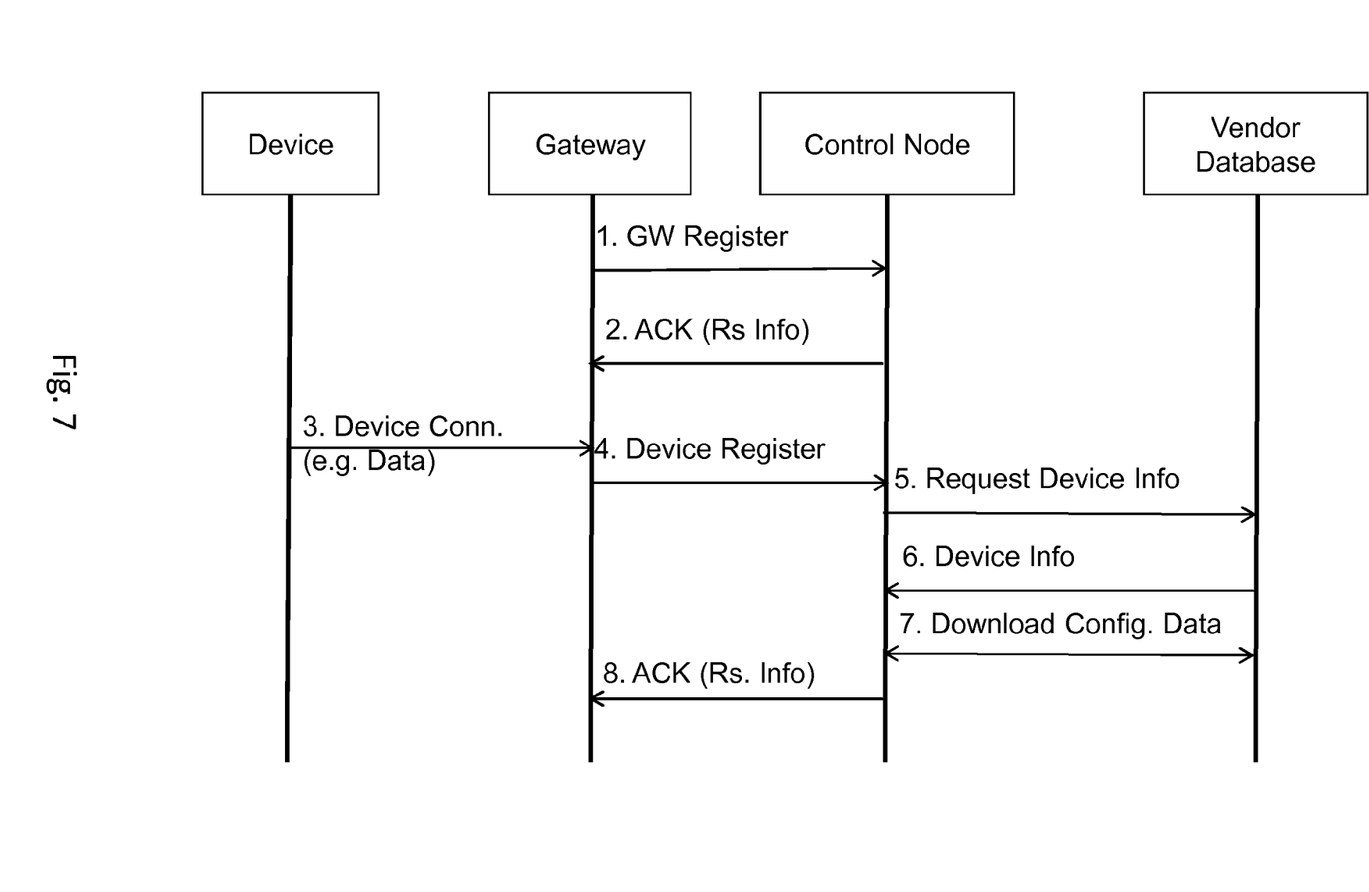
FIG. 7 is a signaling diagram illustrating an example of a procedure when the solution is used, according to further possible embodiments.

Now looking at FIG. 7, which shows a signaling diagram illustrating an example of the signaling between a control node 100, device 110, gateway 120 and vendor database 130. In a signal 1, the gateway 100 may transmit a registration request. In a signal 2, the control node 100 may acknowledge the registration and may include any already provided resources 140. In a signal 3, a newly connected device 110 may be detected. In a signal 4, the gateway 120 may transmit a request message including an id of the newly detected device 110. In a signal 5, the control node 100 may transmit a request with the device 110 id to a vendor database 130. In a signal 6, the vendor database 130 may respond with which configuration data that may be suitable for the device 110 and where to download the configuration data. In a signal 7, the configuration data may be downloaded to the control node 100. In a step 8, the control node 100 may acknowledge to the gateway 120, that a resource 140 is operational for the newly detected device 110.

Figure 8:
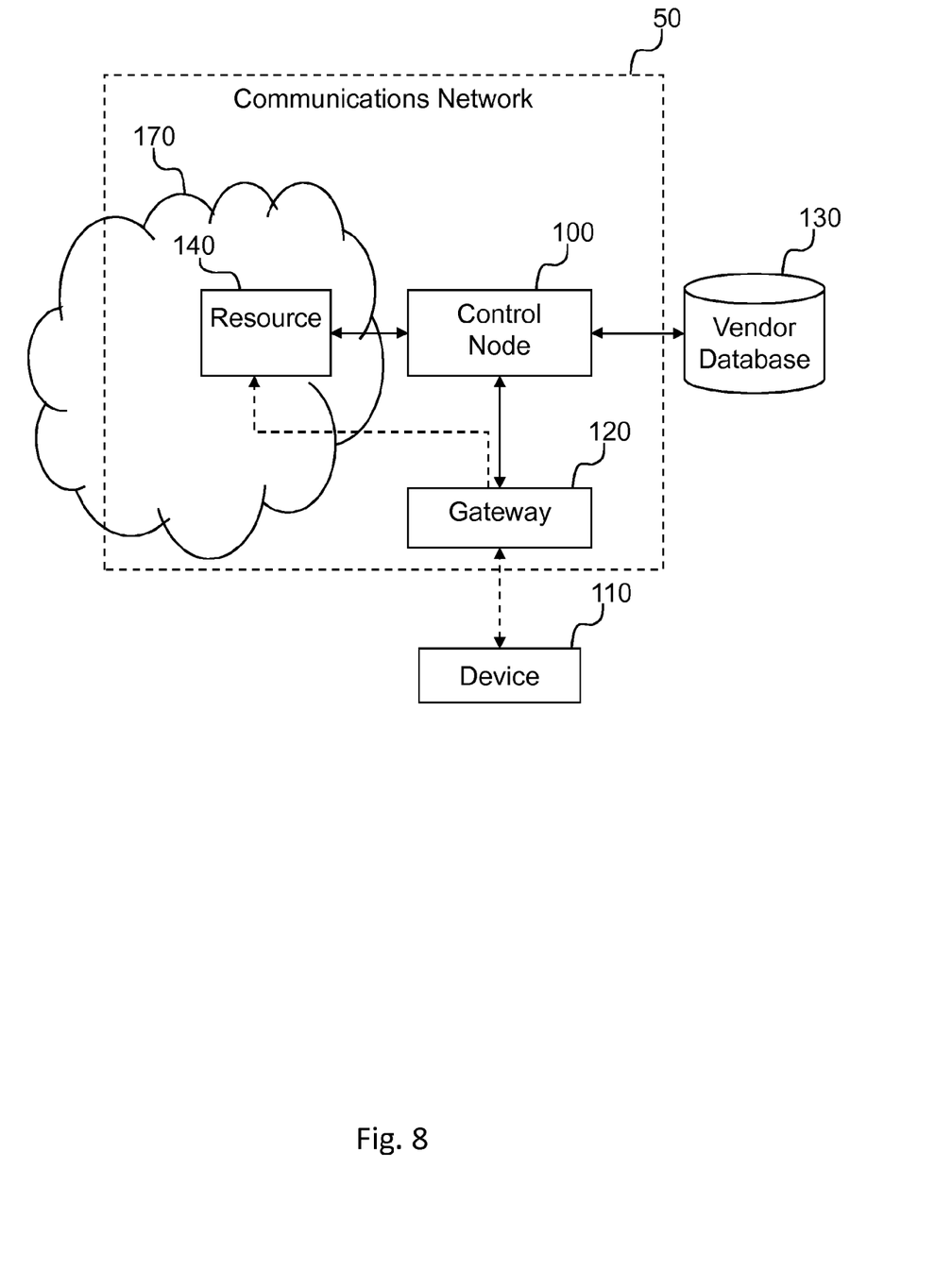
FIG. 8 is a block diagram illustrating an implementation in a cloud scenario.

FIG. 8 shows an example of implementation of the solution, where the resource 140 is located in a cloud 170. Cloud may also be denoted shared service common computing facility, distributed data center, not limiting other similar terms to be used. The cloud 170 may be locally located in an operator network, or accessible from the operator's network, or accessible from the communications network. The cloud may be adopted for provision of resources 140 serving devices 110. The cloud may a general cloud, with regional or global coverage, serving various users and needs, including facilitating operations of resources 140. A non limiting example is where the control node 100 is located in the vicinity of a group of gateways 120 and the resources 140, for devices 110 connected to gateways 120, are located in a cloud 170.

Figure 9:
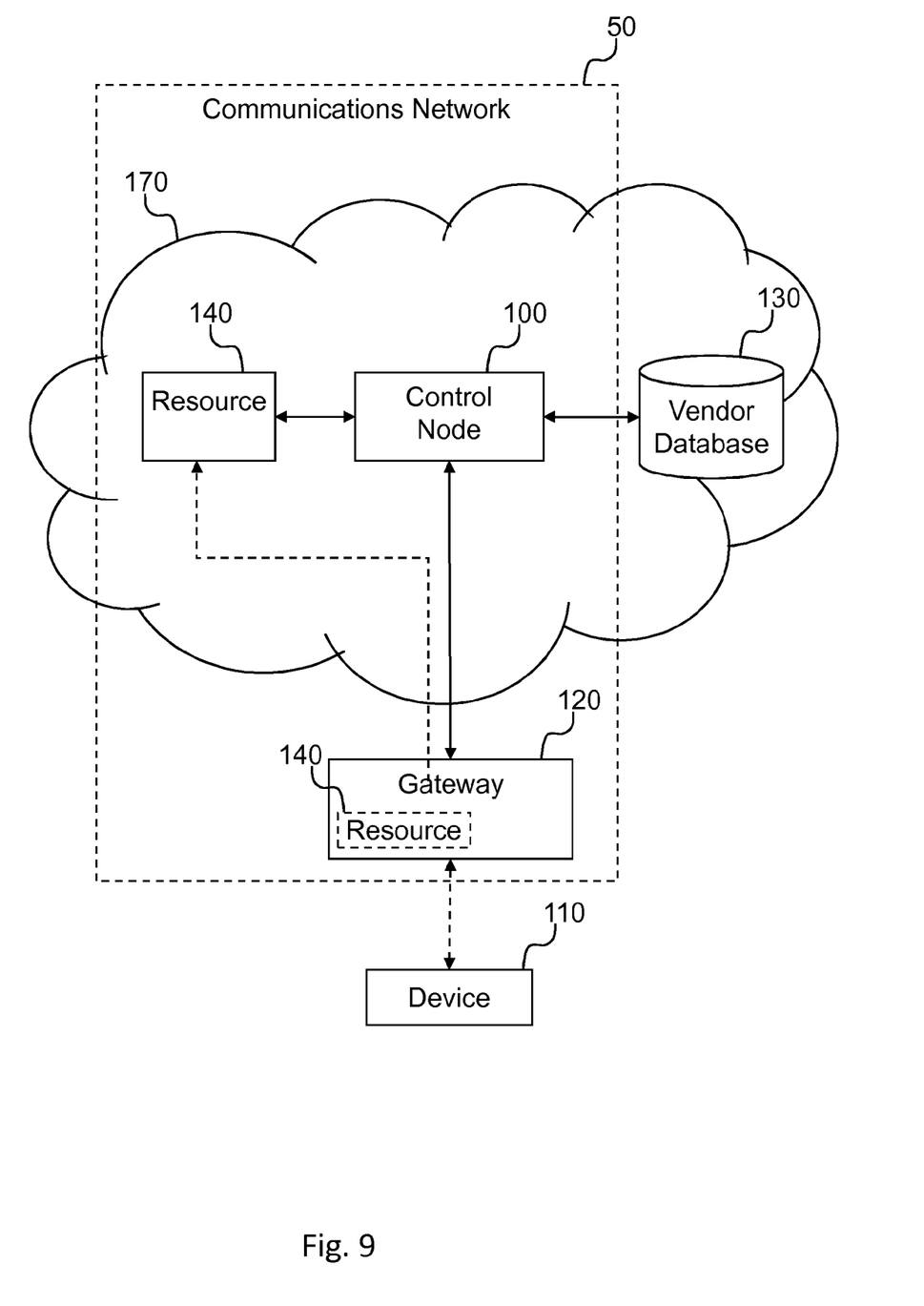
FIG. 9 is a block diagram illustrating an implementation in a cloud scenario, according to further possible embodiments.

FIG. 9 shows a non limiting example of the control node 100, the vendor database 130 and the resource 140 located in a cloud 170. In such an example the gateway 120 is for example instructed by the PDP context creation or the DNS where to transmit the registration message, to reach the cloud based control node 100. Advantages with the control node 100, the vendor database and the resource 140 located in a cloud, are that it becomes efficient for device vendors to cooperate, simple to maintain and update configuration data for both upgraded and new models of devices.

How to most efficient set up and operate a control node 100, vendor databases 130, and where and how to deploy resources 140, is subject for implementation and known by the skilled person. It should also be noted that the control node 100, vendor database 130 and resources 140, may be clustered in different ways, depending on different needs, such as scalability, robustness, redundancy and service responsivity. An example may be where at least a part of a resource 140 is provided to the gateway 120. In such an example common functions may be located in the cloud 170 and a part of the resource 140 that requires quick responsivity is located nearby the device 110.

An advantage with utilizing at least a part of the solution in a cloud type of environment is that the cloud environment may provide a better scalability and may better provide a dynamic support for provision of resources 140 in a efficient and economical way, compared with traditional data center models. A cloud based solution may advantageously support addition and withdrawal of computing resources in an efficient way, which may be more economical than traditional computer centers.

While the solution has been described with reference to specific exemplary embodiments, the description is generally only intended to illustrate the inventive concept and should not be taken as limiting the scope of the solution. For example, the terms "control node", "device" and "resource" have been used throughout this description, although any other corresponding nodes, functions, and/or parameters could also be used having the features and characteristics described here. The solution is defined by the appended claims.

The invention claimed is:

1. A method performed by a control node in a communications network for enabling communication with a newly detected device connected to the network, the method comprising:
   receiving a request message including an id associated with the newly detected device from a gateway;
   retrieving configuration data associated with the device based on the id, from a device vendor database, where the device vendor database is indicated by the id;
   providing a resource in the communications network based on the configuration data; and
   acknowledging the request message to the gateway, thereby enabling the device to communicate with the resource in the communications network,
   wherein when the control node is unable to resolve the device vendor database indicated by the id, retrieving complementing device information from a device identification node, for resolution of from which device vendor database to retrieve configuration data.

2. The method according to claim 1,
wherein the configuration data comprises at least one of configuration information or a software component.

3. The method according to claim 1, further comprising:
receiving a registration message from the gateway; and
transmitting an acknowledgement message to the gateway acknowledging a successful registration,
wherein when the gateway is already registered, the acknowledgement message includes information about at least one resource already provided for the gateway.

4. The method according to claim 3,
wherein the registration message includes information about at least one of authentication, privileges or subscription.

5. The method according to claim 1,
wherein the id associated with the device comprises at least one of device vendor, vendor address, device type, cryptographic number, software version or MAC-address.

6. A non-transitory computer readable medium comprising computer instructions which when executed by a processor, cause a control node in a communications network to perform the method of claim 1.

7. A control node in a communications network for enabling communication with a newly detected device connected to the network, the node adapted to:
receive a request message including an id associated with the newly detected device from a gateway;
retrieve configuration data associated with the device based on the id, from a device vendor database, where the device vendor database is indicated by the id;
provide a resource in the communications network based on the configuration data; and
acknowledge the request message to the gateway, thereby enabling the device to communicate with the resource in the communications network,
wherein when the control node is unable to resolve the device vendor database indicated by the id, the control node is further adapted to retrieve complementing device information from a device identification node, for resolution of from which device vendor database to retrieve configuration data.

8. The node according to claim 7,
wherein the configuration data comprises at least one of configuration information or a software component.

9. The node according to claim 7, wherein the node is further adapted to:
receive a registration message from the gateway; and
transmit an acknowledgement message to the gateway which acknowledges a successful registration,
wherein when the gateway is already registered, the acknowledgement includes information about at least one resource already provided for the gateway.

10. The node according to claim 9,
wherein the registration message includes information about at least one of authentication, privileges or subscription.

11. The node according to claim 7,
wherein the id associated with the device comprises at least one of device vendor, vendor address, device type, cryptographic number, software version or MAC-address.

* * * * *